June 3, 1952 J. WALKER 2,598,950

RECORDING APPARATUS

Filed Sept. 29, 1945 3 Sheets-Sheet 1

INVENTOR.
Joseph Walker
BY
George A. Auer
Atty.

RECORDING APPARATUS

INVENTOR.
Joseph Walker
BY
George A. Auer
Atty.

RECORDING APPARATUS

INVENTOR.
Joseph Walker
BY
George A. Auer
Atty.

UNITED STATES PATENT OFFICE 2,598,950

RECORDING APPARATUS

Joseph Walker, Berwyn, Ill.

Application September 29, 1945, Serial No. 619,341

3 Claims. (Cl. 242—57)

This invention relates to recording apparatus, and is particularly concerned with improvements in apparatus of the pen-tape-recorder type.

The object of the invention is to provide a novel tape take-up operating in conjunction with a storage reel on which the tape record is wound, comprising means for maintaining even tension on the tape record and for intermittently operating a motor at predetermined intervals, for winding the tape record on the storage reel.

Additional objects relate to the arrangement of, and interaction between, the various elements, comprising the tape supply, the recorder proper, and the tape take-up, for the purpose of providing a recording apparatus of great flexibility and versatility, which may be used for numerous recording operations in conjunction with local or remote control, and in each case adapted for recording various types of signals.

The various objects and features of the invention will be brought out in detail in the following description, which is presented below with reference to the drawings. In these drawings, Fig. 1 illustrates an embodiment of the invention in front view;

Figure 8:
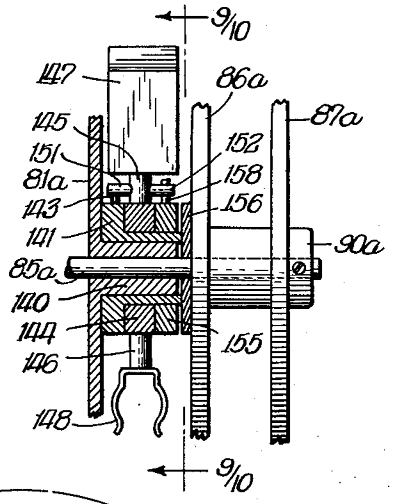
Figures 9, 10:
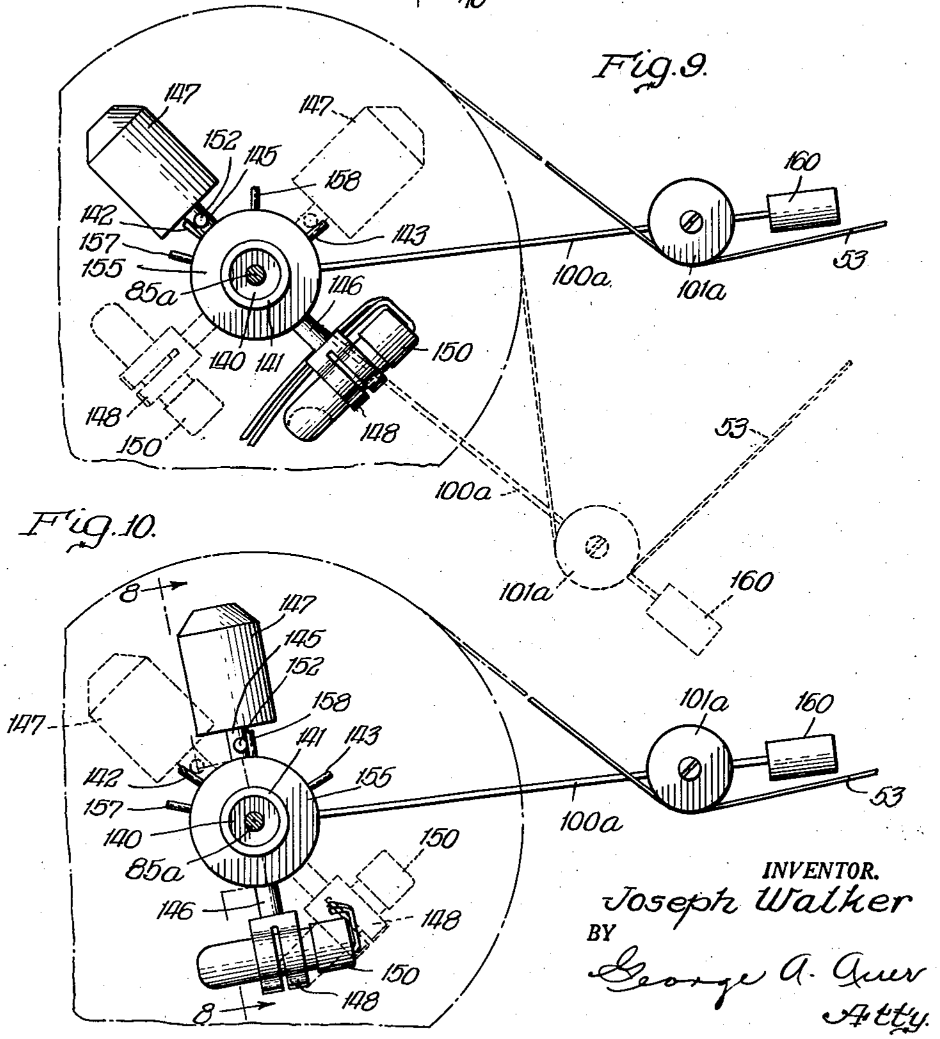

Fig. 8 represents a fragmentary side view partially in section, taken approximately along lines 8—8 in Fig. 10, of another embodiment of a tape take-up device; and Figs. 9 and 10 are fragmentary front views partially in section, taken approximately along lines 9/10—9/10 in Fig. 8 illustrating the tape take-up in two different operating positions.

Like parts are indicated in the drawings by like reference numerals.

Figure 1:
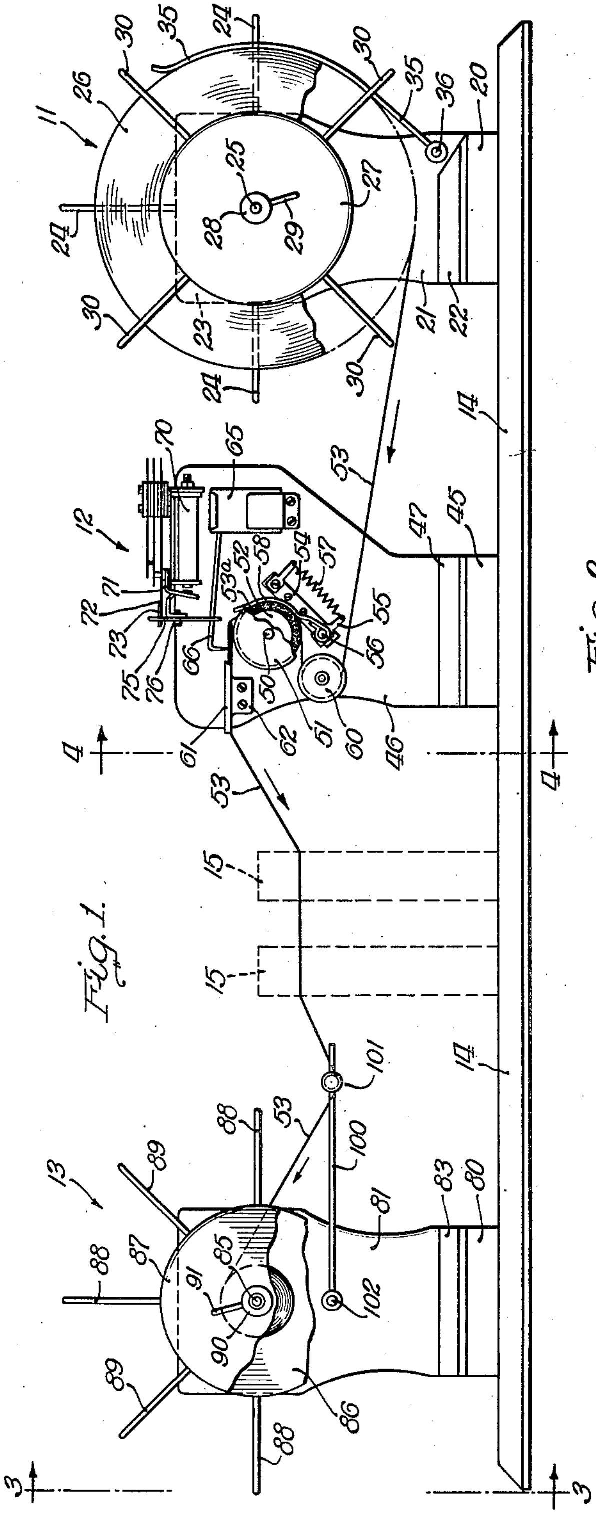
Figure 2:
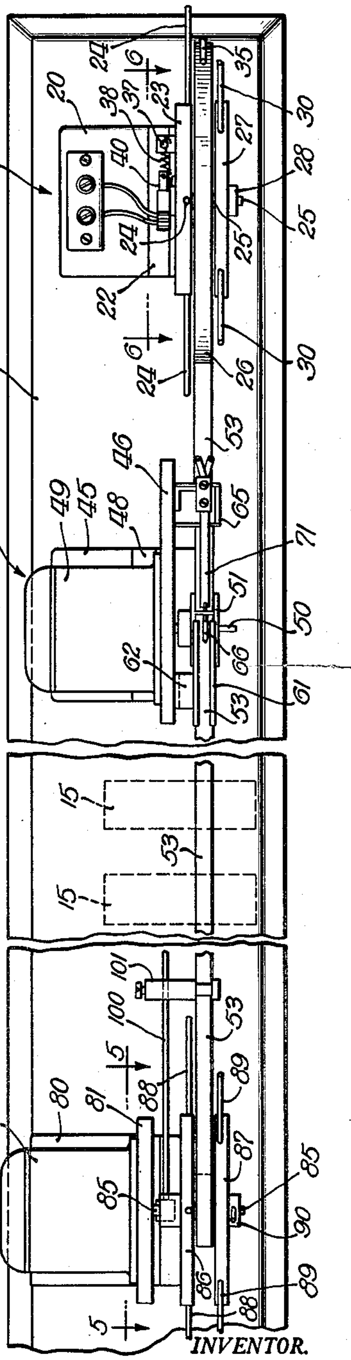
Fig. 2 shows a top view of the apparatus illustrated in Fig. 1.
Figure 7:
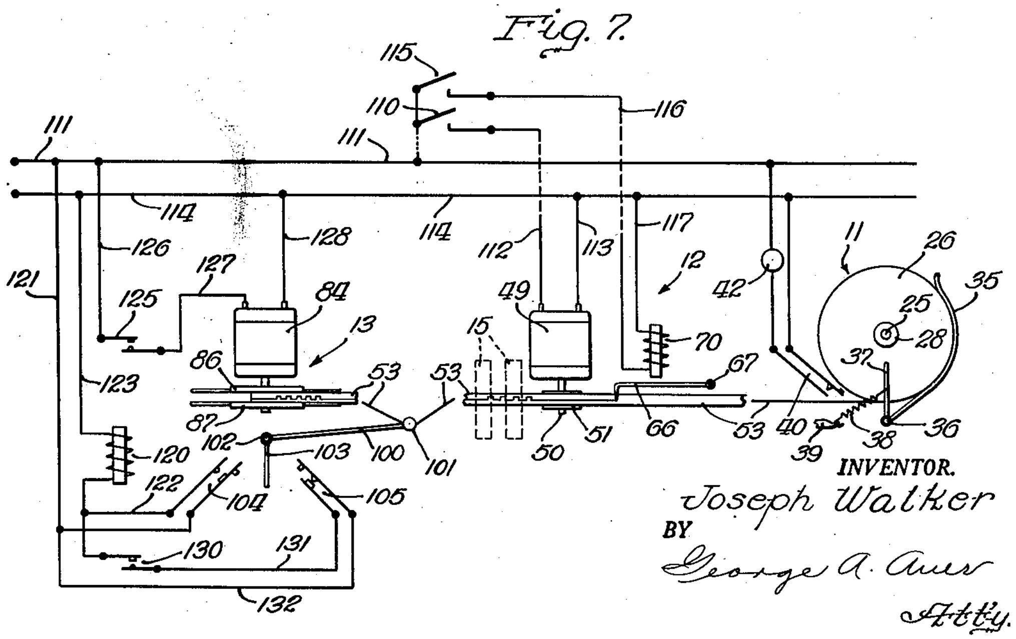
Fig. 7 is a comprehensive circuit and operation diagram of the apparatus shown in Figs. 1 and 2.

The recording apparatus, as shown in Figs. 1, 2 and 7, comprises a tape supply unit indicated generally at 11, the pen recorder unit generally indicated at 12, and a tape take-up unit indicated generally at 13. Numeral 14 denotes a common base on which the various units are mounted. The dotted rectangles 15 are intended to indicate time stamps or the like which may be used, e. g., for the purpose of stamping on the tape record the date as well as the beginning and conclusion of the time of recording.

Figures 3, 4, 5, 6:
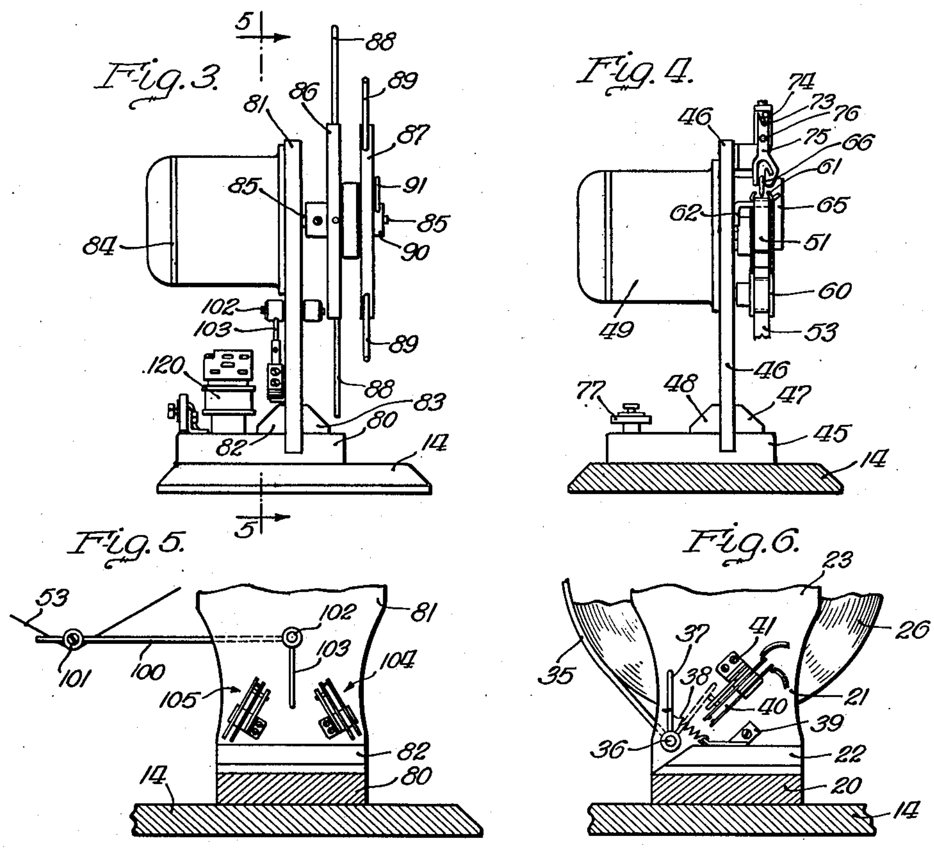
Fig. 3 represents an end view, as seen when looking in the direction of the arrows along lines 3—3 in Fig. 1, showing one embodiment of a tape take-up device and certain details associated therewith.
Fig. 4 is a section taken approximately along lines 4—4 of Fig. 1, showing an end view of the recorder proper.
Fig. 5 is a partial view of the tape take-up device as seen from the rear, when looking in the direction of the arrows approximately along lines 5—5 in Figs. 2 and 3, to show certain switching means.
Fig. 6 illustrates in a similar manner certain switching means provided in the rear of the tape supply device, as seen when looking in the direction of the arrows approximately along lines 6—6 in Fig. 2.

The tape supply unit 11 shown at the right end of Figs. 1, 2 and 7, and also partially in Fig. 6, includes a suitable stand which in the example shown comprises a base 20 and an upright 21 joined with the base 20 and secured thereon by suitable corner pieces 22. It is understood that the stand for this tape supply is shown as assembled of several members (base 20, upright 21 and corner pieces 22) mainly for the sake of convenience. If desired, the stand may be made of a single piece by any approved process and of any desired and suitable material. These remarks also apply to the stands for the recorder unit 12 and for the tape take-up unit 13.

The upright mounting plate 21 is slightly enlarged in its upper section, as marked by numeral 23, and is provided with a number of radially extending posts or pins 24. A shaft 25 projects forwardly from the upper section 23 of the mounting plate 21, forming a hub for the tape roll 26. Mounted on the shaft in front of the tape roll 26 is a plate 27 forming with the section 23 of the upright 21 a reel for the tape roll 26. The plate 27 is held in place on the shaft 25 by means of a nut 28 provided with a suitable handle 29. Pins or posts 30 project radially from the plate 27, forming companion reel extensions for coaction with the posts or pins 24.

The tape supply unit is provided with means for the continual checking of the tape and with means for signalling the impending exhaustion thereof. Structural details are described below.

An arm 35 is secured to a shaft 36, and the latter is journalled in the upright 21. Also attached to the shaft 36 in back of the upright 21 (see Fig. 6) is an arm or pin 37. A spring 38 is secured at one end to the pin 37 and is anchored at its other end on a bracket 39. The spring exerts a pull on the pin 37, thereby tending to rotate the shaft 36 so as to bias the arm 35 radially inwardly. The arm 35 thus rests circumferentially on the tape roll and therefore acts as a follower and as a brake to inhibit free rotation of the tape roll on the reel hub. Its motion radially inwardly depends on variations in the diameter of the tape roll. As the diameter decreases with progressive unwinding of the tape, during the recording operation, the arm 35 moves inwardly, in counter-clockwise direction as seen in front, Figs. 1 and 7, and in clockwise direction as seen from the rear, Fig. 6, and correspondingly displaces the pin 37 toward the contacts 40 mounted on a bracket 41 which is attached to the upright plate or panel 21. The pin 37, which is adjustable on the shaft 36, is shown in Fig. 6 in dotted lines near its contact actuating position. The arm or pin 37 can be angularly suitably adjusted, on the shaft 36, and the operator is thus enabled to determine the contact closure in accordance with any desired position of the follower 35, and is likewise enabled to adjust the contact operation in accordance with tape rolls of different diameter.

When the tape supply diminishes to a predetermined low, the pin 37 closes the contacts 40 and thereby closes a circuit for a suitable signal 42 (see Fig. 7) which may be a lamp or buzzer or the like. A relay may be connected in this circuit for the purpose of operating remotely disposed signal means. If desired, additional supervising or control means, e. g., a counter, may also be included in the circuit, or may be actuated by such relay, for the purpose of keeping a record of the number of times the need for the insertion of new tape arises during the operation.

The recorder device 12, as shown in Figs. 1, 2, 4 and 7, is mounted on a stand similar to the one described in connection with the tape supply unit. The stand comprises a mounting member 45 suitably secured to the common base plate 14. Attached to the member 45 is the upright 46. Corner pieces, as indicated at 47, 48, reinforce and secure the attachment of the upright 46 in the mounting member 45.

Mounted on the upright 46 and projecting from the back thereof is a motor 49. The shaft 50 of this motor projects forwardly through the upright plate 46 and carries a drive reel 51. This drive reel comprises two flange-like members, one on either side of a hub 52, as shown in Fig. 1. A ring-like member 53*a* made of elastic material, for example, rubber, is carried on the hub 52. This member constitutes the elastic friction drive for feeding or advancing the tape 53 through the recorder unit 12 in the direction indicated in Fig. 1 by the arrows.

Also mounted on the upright 46 of the stand is a bracket 54 carrying an arm 55 which is hingedly mounted at 56. The arm 55 is biased in counter-clockwise direction, as seen in Fig. 1, by means of the spring 57. Coacting with the arm 55 and also hingedly mounted at 56 is the arm or follower 58 which constitutes the slip pressure member of the friction drive for advancing or feeding the tape 53.

The tape is fed to the recorder 12 over a guide roller 60 and then over the elastic motor driven friction drive 53*a* against which it is held by the follower 58, and leaves the recorder over a member 61 which is mounted on the upright 46 by means of bracket 62. The member 61 forms the platen of the recorder unit. As the motor 49 operates, it rotates the friction drive member 53*a* which grips the tape and moves it over the platen 61 in the direction of the arrow. The follower 58 holds the tape in engagement with the elastic drive roller.

Numeral 65 indicates an ink-well mounted on the upright 46 by suitable bracket means. From the ink-well extends the pen 66, its point being in engagement with the tape on the platen 61. For the sake of convenient representation the pen 66 is indicated in Fig. 7 as being pivoted at 67, in a position as if it formed the armature of the relay 70. In reality, of course, it extends into the ink-well 65, as shown in Fig. 1. Its displacement is under the control of the impulse receiving relay 70, as explained below.

The impulse receiving relay 70 is adapted to actuate an armature 71, thereby displacing the spring 72 which is provided with a pin 73 resting in an inclined slot 74 in the member 75. The latter is rotatably mounted at 76 on an extension of the stationary heel piece of the relay. Actuation of the armature 71 therefore causes clockwise rotation of the member 75 (see Fig. 4), and thereby a transverse displacement of the pen 66 on the tape moving over the platen 61.

The relay 70 may receive actuating impulses from a remotely disposed position. This will be presently described more in detail. The contacts shown in Fig. 1 on top of the impulse-receiving relay 70 may be used for any desired control purposes. A terminal 77 is provided, as shown in Fig. 4, for wiring the unit. Similar terminals are also provided on the tape supply and on the tape take-up units.

The tape take-up unit 13 is mounted on a stand which may be constructed similarly to the stands described in connection with the tape supply and the recorder unit. In the example shown, and as is particularly apparent from Fig. 3, the stand includes a mounting member 80 and an upright plate 81 secured by means of corner pieces indicated at 82 and 83.

Mounted on the upright 81, in the rear thereof, is the motor 84. The motor shaft 85 projects forwardly through the upright 81 (see Figs. 2 and 3), and suitably secured to the shaft is the reel comprising the flanges 86 and 87 for receiving the tape record. The flange 86 is provided with radially extending guide pins 88 and the flange 87 carries similar guide pins 89. The attachment of the reel is secured by means of a suitable nut 90 carrying a handle 91. The tape 53 is wound on the take-up reel responsive to operation of the motor 84.

The features which are believed to be novel in connection with this tape take-up unit are concerned, first, with means for placing even tension on the tape 53 and, second, with means for actuating the motor only at times when such actuation is needed. In other words, the tape take-up is subject to intermittent operation of the motor. Structural details of this improvement as embodied in Figs. 1, 2, 3, 5 and 7 are explained below.

A lever arm 100 is provided with a roller 101 which rests on the tape 53. The roller 101 is adjustably secured on the lever arm 100 and the latter is mounted on a shaft or pin 102, journalled in the upright 81. Also secured to the shaft 102, in the rear of the upright 81, is an arm or lever 103 (see Figs. 3, 5 and 7) for coaction with the make contacts 104 in one direction of rotation of the shaft 102 and for coaction with the break contacts 105 when the shaft 102 rotates in opposite direction. The lever arms 100 and 103 are angularly adjustable on the shaft or pin 102 so as to provide for selective adjustment of contact actuation.

During the operation of the apparatus the tape 53 is advanced in the direction of the arrows indicated in Fig. 1, and inasmuch as the weight of the roller 101 rests on the tape, the tape is kept under even tension and the arm 100 is displaced downwardly, in clockwise direction as seen in front, Figs. 1 and 7, and in counterclockwise direction as seen from the rear, Fig. 5. As the arm 100 drops downwardly with the sagging of the tape, it displaces the arm 103 angularly in the direction of the make contacts 104. When these contacts are actuated by the arm 103, they close a certain circuit to initiate the operation of the motor 84. The motor in turn rotates the reel comprising the flanges 86 and 87 and takes up the sagging tape 53, winding the tape on the take-up reel. The lever 100 is thus displaced in opposite direction, opening the contacts 104, but the motor continues to operate over a holding circuit, as will be presently explained. When the arm 100 assumes a certain high position, it actuates the break contacts 105 which in turn open the holding circuit of the motor.

The operation will now be described more in detail with reference to Fig. 7.

It is assumed that the tape roll 26 has been inserted into the tape supply unit 11 and that the tape has been properly threaded over the guide roller 60, friction drive 51, and platen 61 of the recorder unit 12, and thence to the take-up unit 13. Time or date stamps indicate in dotted lines and designated at 15 (Figs. 1 and 7) may be used if desired, and if these are used, the tape 53 must also be threaded through such time and date stamps.

The recording operation is initiated by the actuation of the motor 49 of the pen recorder unit 12. A circuit may for this purpose be closed by a suitable switch including a contact 110 which may be part of a remotely disposed control equipment. The circuit for the motor is closed from one pole 111 of the main supply circuit over switch contact 110, conductor 112, motor 49, conductor 113, back to the other pole 114 of the current source. The motor 49 now operates and moves the tape 53 in the direction of the arrows shown in Fig. 1.

The signals may be sent by any suitable control means, including, for example, a contact 115 which upon each actuation closes a circuit from the pole 111 of the current source over conductor 116 to the winding of the impulse receiving relay 70 and back to the other pole 114 of the current source over conductor 117. The contact 115 may be operated by a dial such as used in automatic telephone sets. The signals may correspond to a code or codes to be recorded on the tape. The contact 115 may also be part of any other suitable apparatus or mechanism in conjunction with signals designating such record as it may be desired to produce.

The apparatus may be used for most types of recording that occur in practice, including industrial machine production records; code sending and receiving records, e. g., in police and fire alarm systems; watchman and other supervision records; industrial production records; elevator control; telephone service operation equipment; etc., etc.

The signals are recorded on the tape and the tape record is advanced from right to left, as seen in Figs. 1, 2 and 7. If time stamps 15 are provided, their operation is suitably controlled, locally or from the sending station, in a similar manner as the motor and the relay 70 are controlled by the contacts 110 and 115. These time stamps are shown merely for the sake of convenience; they do not form part of the present invention.

The tape is held under even tension by the weight of the roller 101 resting thereon. The tape thus sags progressively adjacent to the take-up device 13. The lever 100 is accordingly displaced as previously described, and when the tape assumes the lowermost position, the contacts 104 are closed, causing energization of the relay 120 from the line 111 of the current source, conductor 121, closed contacts 104, conductor 122, winding of relay 120, conductor 123, back to the line 114 of the current source. The relay 120 closes its make contacts 125, thereby connecting current to the motor 84 over a circuit including the conductors 126, 127 and 128. The motor 84 operates the reel 86—87 and the rotation of the reel takes up the sag in the tape.

The lever 100 and the arm 103 are thereby displaced in opposite direction, and the contacts 104 are eventually opened. The relay 120, however, has also closed contacts 130 and has connected itself in a holding circuit over conductor 131, break contacts 105, and conductor 132, back to conductor 121 and thence to the current source. As a consequence, relay 120 remains energized and contacts 125 remain in closed position. The motor 84 continues to rotate and to take up the tape record. When a predetermined position is reached, arm 103 opens the contacts 105, thereby opening the holding circuit for relay 120 which deenergizes and opens at contacts 125 the circuit for the motor 84. The motor stops. The holding circuit for the relay 120 is opened at contacts 130.

The recording continues until the sag in the tape record again causes angular displacement of the arms 100 and 103 sufficiently to close the contacts 104 so as to repeat the intermittent tape take-up operation as described.

The various devices are shown in Fig. 7 as connected to a common current source. This has been done for the sake of convenience, but may not necessarily be the case. For example, the recorder impulse receiving relay 70 may be fed from a current source different from the one provided for the operation of the motors 49 and 84.

The apparatus has been shown as comprising three distinct units, namely, tape supply, pen recording, and an embodiment of a tape take-up unit, each on its own separate upright, and all uprights mounted on a common base. It is understood that these units may be differently disposed, for example, on a suitable structure forming a common upright. The subdivision adopted in the illustrated embodiment makes the apparatus, for certain purposes, more flexible and more versatile than would otherwise be the case. The tape supply unit and the tape take-up unit may also be used with recording apparatus different from the one specifically shown and described herein.

Another embodiment of a tape take-up device which may be used in place of the one just described and shown in Figs. 1, 2, 3, 5 and 7 will now be explained with reference to Figs. 8, 9 and 10.

Fig. 8 shows part of the take-up reel in elevation. This reel comprises the flanges 86*a* and 87*a* which correspond to the flanges 86 and 87 of the take-up reel of the previous embodiment. The reel is attached to the motor shaft 85a which corresponds to the motor shaft 85 of the embodiment described before. Numeral 81a indicates a housing or supporting member which may correspond to the upright 81 in Fig. 3, or may be part of the motor housing. This member is shown in Fig. 8 in section, and portions of certain parts of the actuating mechanism of the take-up device are likewise shown in section. The section is taken approximately along the lines 8—8 in Fig. 10. Figs. 9 and 10 show the tape take-up device fragmentarily in front views, with the motor shaft 85 in section taken approximately along lines 9/10—9/10 in Fig. 8.

As seen in Figs. 8, 9 and 10, the stationary member 81a is provided with a hub 140 which projects forwardly therefrom. Firmly attached to this hub is a bushing-like member 141. This member carries two stop means 142—143. Rotatably mounted on the shaft of the bushing 141 is a ring-like member 144 carrying arms or extensions 145—146 which project radially therefrom. Attached to the arm 145 is a weight 147, and attached to the arm 146 is a clip 148 for clamping around and thus supporting a mercury switch 150. This switch is omitted in Fig. 8. The arm or extension 145 is also provided with a pair of pins 151—152. The pin 151 projects rearwardly for coaction with the stop pins 142—143, and the pin 152 projects forwardly for coaction with certain drive means which will be presently described in detail.

It will be seen from the foregoing that the ring-like member 144, carrying the arm 145 with its weight 147 and the arm 146 with its clip 148, and switch 150 can be angularly tilted into the positions shown in Fig. 9 in full lines and dotted lines, respectively. In the full-line position the mercury switch 150 is disposed with its mercury drop out of engagement with its interior contacts; in the dotted-line position the switch is disposed with its mercury drop in engagement with such contacts. The full-line position in Fig. 9 therefore is the contact disconnect position, and the dotted-line position is the contact-actuating position. The mercury switch controls the operation of the motor to rotate the shaft 85a and therewith the reel 86a—87a, Fig. 8, so as to take up the tape shown in Figs. 9 and 10 at 53.

The above described parts, comprising the ring-like member 144 with its arms which carry the weight 147 and the mercury switch 150, constitute a switching device which is rotatable on the shank of the bushing 141. Adjacent this switching device, and also rotatable on the shank of the bushing 141, is disposed a ring-like drive member 155. As shown in Fig. 8, the parts are secured by a washer 156 which is interposed between the drive member 155 and the reel flange 86a.

The drive member 155 is provided with a pair of pins 157—158 for coaction with the pin 152 on the arm 145 to drive the switching device from its full-line position in Fig. 9 into its alternate position shown in dotted lines. The drive member 155 is also provided with an arm or lever 100a carrying a roller 101a for engagement with the tape 53. The arm 100a and the roller 101a correspond to the arm and roller 100 and 101, respectively, of the previous embodiment. An additional weight may be provided at the end of arm 100a if desired.

The operation of the device described above and illustrated in Figs. 8, 9 and 10 is explained below. Parts which do not appear in these figures will be mentioned, wherever necessary, by referring to the previously described structure.

It is assumed that the tape 53 has been advanced during the operation of the recording mechanism and has sagged under the weight of the roller 101a and arm 100a, displacing the arm 100a to the position shown in Fig. 9 in dotted lines. The weight 147 and the mercury switch 150 therefore are also in the dotted line connect position, as shown in Fig. 9, the pin 151 (Fig. 8) being in engagement with the stop pin 143 on the bushing 141. The mercury switch 150 has closed a circuit for the motor, such as motor 84 in the previous embodiment. Accordingly, the shaft 85a, Figs. 8, 9 and 10, rotates. The take-up reel comprising the flanges 86a and 87a, being attached to the motor shaft, therefore rotates with it and winds up the sagging tape 53. The tape lifts the roller 101a and the arm or lever 100a which is attached to the ring-like drive member 155, rotating this drive member in counter-clockwise direction, as seen in Figs. 9 and 10, thus angularly displacing the pins 157—158 which extend from the drive member. The pin 158, in the course of its angular displacement, engages the pin 152, projecting from the arm 145 just underneath the weight 147, and thus rotates the switching device with its mercury switch and weight 147 in counter-clockwise direction. The switching device finally reaches the position shown in full lines in Fig. 10; that is to say, it is rotated past dead-center. The switching device now continues to rotate by the force of the weight 147 into the dotted-line position shown in Fig. 10. The pin 151 (Fig. 8) engages the stop pin 142 (Figs. 9 and 10). The device is now again in stop position shown in Fig. 9 in full lines and in Fig. 10 in dotted lines. As the device passes dead-center the mercury drop opens the interior contacts and thus stops further operation of the motor. The sag in the tape 53 has been taken up.

The recording operation continues and the tape is therefore continuously advanced and progressively sags under the weight of the masses 101a and 160. The lever arm 100a follows and is angularly displaced in clockwise direction, as seen in Fig. 9. Pin 157 projecting from the drive member 155 is thus displaced in the direction of the pin 152 on arm 145 of the switching device, and finally engages this pin. During further sagging of the tape and consequent displacement of arm 100a and drive member 155 the pin 157 rotates the switching device from its stop position (full lines in Fig. 9) in clockwise direction until the device passes dead-center, when it continues rotation by the force of the weight 147 and drops into its dotted-line position. As the device passes dead-center the mercury drop closes the interior contacts in the switch 150 to start the motor again so as to take up the sagging tape, as described before.

The motor is in this manner intermittently operated substantially as described in connection with the embodiment discussed before. The use of one or the other take-up device disclosed herein will be determined by operating conditions and requirements in any given case.

Changes may be made within the scope and spirit of the following claims which define what is considered new and desired to have protected by Letters Patent of the United States.

I claim:

1. A device for intermittently rotating a take-up reel to wind up tape fed thereto comprising an arm forming a follower in contact with the tape and being angularly displaced thereby in accordance with the sag thereof, a motor which is normally at rest, a circuit for said motor, a relay, contact means actuated by said follower responsive to a predetermined sag in said tape for causing energization of said relay, contact means actuated by said relay for closing a point in the circuit of said motor to cause operation of thereof so as to rotate said reel to take up the sagging tape, a holding circuit controlled by said relay to maintain its energization independent of the contact means actuated by said follower, said motor continuing to operate under control of said energized relay to rotate said reel until a predetermined portion of said sagging tape is wound thereon, and additional contact means controlled by said follower when said predetermined portion of the tape is wound on said reel for interrupting said holding circuit to deenergize said relay so as to stop the operation of said motor.

2. In combination, a stationary support carrying a bushing extending therefrom, a motor having a shaft extending through said bushing and projecting therefrom, a tape reel carried on the free end of said motor shaft for receiving a tape fed thereto, and a switching device for intermittently operating said motor, said switching device comprising a ringlike member rotatably mounted on said bushing, a first arm radially extending from said ringlike member and carrying a mercury switch, a second arm radially extending from said ringlike member and carrying a weight to counterbalance the weight of said mercury switch, a drive member rotatably mounted on said bushing adjacent said ringlike member, a lever arm forming a follower carried by and radially extending from said drive member with its free end in engagement with said tape, whereby deflection of said tape causes angular displacement of said drive member, a pair of actuating pins extending radially from said drive member for interaction with a coacting pin extending laterally from said second arm to cause angular displacement of said ringlike member and therewith displacement of said weight and said mercury switch responsive to angular displacement of said drive member in accordance with the position of said tape at the point of engagement with said follower, and circuit means controlled by said mercury switch for controlling the operation of said motor.

3. The structure and combination defined in claim 2, together with a pair of stop pins extending radially from said bushing for interaction with a stop pin extending laterally from said second arm to limit the angular displacement of said mercury switch.

JOSEPH WALKER.

REFERENCES CITED

The following references are of record in the file of this patent:

UNITED STATES PATENTS

| Number | Name | Date |
|---|---|---|
| 1,078,861 | Koch | Nov. 18, 1913 |
| 1,378,887 | Martin | May 24, 1921 |
| 1,641,658 | Berglund | Sept. 6, 1927 |
| 1,837,237 | Shangle | Dec. 22, 1931 |
| 1,828,569 | Kellogg | Oct. 20, 1931 |
| 1,919,607 | Thompson | July 25, 1933 |
| 1,974,153 | Eitzen | Sept. 18, 1934 |
| 1,997,601 | Reiber | Apr. 16, 1935 |
| 2,043,354 | Mallina | June 9, 1936 |
| 2,097,142 | Borton | Oct. 26, 1937 |
| 2,153,317 | Sigo | Apr. 4, 1939 |
| 2,172,637 | Fader | Sept. 12, 1939 |
| 2,229,480 | Spencer et al. | Jan. 21, 1941 |
| 2,262,032 | Moore | Nov. 11, 1941 |
| 2,346,883 | Wait | Apr. 18, 1944 |

FOREIGN PATENTS

| Number | Country | Date |
|---|---|---|
| 423,624 | Great Britain | Feb. 5, 1935 |